US012561121B2

(12) United States Patent (10) Patent No.: US 12,561,121 B2

Jo et al. (45) Date of Patent: Feb. 24, 2026

(54) METHODS AND SYSTEM FOR PERFORMING CHECKPOINTING FOR FAULT TOLERANCE IN APPLICATION

(71) Applicant: MOREH CORP., Seoul (KR)

(72) Inventors: Gangwon Jo, Seoul (KR); Jungho Park, Seoul (KR)

(73) Assignee: MOREH CORP., Seoul (KR)

( * ) Notice: Subject to any disclaimer, the term of this patent is extended or adjusted under 35 U.S.C. 154(b) by 31 days.

(21) Appl. No.: 18/592,791

(22) Filed: Mar. 1, 2024

(65) Prior Publication Data

US 2024/0303161 A1 Sep. 12, 2024

(30) Foreign Application Priority Data

Mar. 6, 2023 (KR) ......................... 10-2023-0029483
Aug. 17, 2023 (KR) ......................... 10-2023-0107722

(51) Int. Cl.
*G06F 11/00* (2006.01)
*G06F 8/41* (2018.01)
(52) U.S. Cl.
CPC ................ *G06F 8/45* (2013.01); *G06F 8/443* (2013.01)
(58) Field of Classification Search
CPC .. G06F 11/203; G06F 11/1407; G06F 11/143; G06F 11/1438; G06F 11/2025; G06F 11/2028; G06F 11/302
See application file for complete search history.

(56) References Cited

U.S. PATENT DOCUMENTS

| | | | |
|---|---|---|---|
| 2004/0153866 A1 | 8/2004 | Guimbellot et al. | |
| 2008/0201602 A1 | 8/2008 | Agarwal et al. | |
| 2012/0159462 A1 | 6/2012 | Leibman et al. | |
| 2015/0178164 A1* | 6/2015 | Zhang ................. | G06F 11/1435 |
| | | | 714/20 |
| 2016/0077922 A1* | 3/2016 | Yoon ..................... | G11C 29/52 |
| | | | 711/162 |
| 2021/0398020 A1* | 12/2021 | Ahmad ................. | G06N 20/00 |

FOREIGN PATENT DOCUMENTS

| | | |
|---|---|---|
| KR | 10-2012-0040707 A | 4/2012 |
| KR | 10-2014-0000283 A | 1/2014 |
| KR | 10-2016-0055723 A | 5/2016 |
| KR | 10-2019-0066712 A | 6/2019 |
| WO | 2011/008734 A1 | 1/2011 |

* cited by examiner

*Primary Examiner* — Jason B Bryan
(74) *Attorney, Agent, or Firm* — Banner & Witcoff, Ltd.

(57) ABSTRACT

A method for performing checkpointing for fault tolerance of an application is provided, which is performed by one or more processors, and includes storing accelerator data associated with an application at a specific time point as a checkpoint, storing operation data associated with the application performed after the specific time point, and performing application fault tolerance based on the checkpoint and the stored operation data.

20 Claims, 10 Drawing Sheets

400

S410
RECEIVE OPERATION EXECUTION MESSAGE ASSOCIATED
WITH ACCELERATOR WHILE STORING CHECKPOINT

S420
IS UPDATING BIT VECTOR OF
ACCELERATOR DATA COMPLETED?

YES

S440
EXECUTE OPERATION ASSOCIATED
WITH ACCELERATOR DATA

NO

S430
SUSPEND EXECUTION OF OPERATION ASSOCIATED
WITH ACCELERATOR DATA

700

S710
COMPILE OPERATION GRAPH

S720
EXTRACT ACCELERATOR DATA ASSOCIATED WITH WRITE ACCESS BASED
ON OPERATION GRAPH

S730
CLASSIFY EXTRACTED ACCELERATOR DATA ASSOCIATED WITH WRITE
ACCESS IN TIME ORDER

S740
STORE EACH ACCELERATOR DATA AS CHECKPOINT BASED
ON CLASSIFIED TIME ORDER

FIG. 9

METHODS AND SYSTEM FOR PERFORMING CHECKPOINTING FOR FAULT TOLERANCE IN APPLICATION

CROSS-REFERENCE TO RELATED APPLICATIONS

This application claims priority under 35 U.S.C § 119 to Korean Patent Application Nos. 10-2023-0029483, filed in the Korean Intellectual Property Office on Mar. 6, 2023, and 10-2023-0107722, filed in the Korean Intellectual Property Office on Aug. 17, 2023, the entire contents of which are hereby incorporated by reference.

TECHNICAL FIELD

The present disclosure relates to a method and system for performing checkpointing for fault tolerance of an application, and specifically, to a method and system for performing checkpointing for fault tolerance of an application, which determine whether checkpointing is performed for each of a plurality of accelerator data by using a bit vector, and performs an operation on the accelerator data for which checkpointing is completed, thereby allowing accelerator operation while performing checkpointing.

BACKGROUND

The spread of mobile devices increases, and various applications using mobile devices have been developed. The applications are often used for critical business processes or services. However, in this case, an application failure may lead to business or service disruption, which may cause problems such as increased costs due to business disruption.

Applications (e.g., artificial intelligence applications, etc.) may fail due to various factors. For example, there may be hardware errors, network problems, user input errors, etc. If an error occurs while the application is being executed, a process of the application may end abnormally, resulting in a failure and the application may stop. In this case, the application can be restarted using the checkpoints stored at regular intervals. The checkpointing refers to storing the current state of an application, and in the event of a failure, the application can be restored to the previous state using the stored checkpoint, thereby minimizing problems caused by business interruption or service interruption.

However, according to some implementations, there is a problem in that other tasks cannot be performed in parallel while the checkpoint is being stored. For example, if a checkpointing period arrives while an accelerator operation is being performed, checkpointing is performed after the accelerator operation process ends, resulting in a problem in that the checkpointing is delayed. In addition, if there is a task execution command while checkpointing is being performed, there is a problem in that task execution is delayed until the checkpointing is completed.

SUMMARY

In order to solve the problems described above, the present disclosure provides a method, a non-transitory computer-readable recording medium for storing instructions, and a device (system) for performing checkpointing for fault tolerance of an application.

The present disclosure may be implemented in a variety of ways, including a method, an apparatus (system), or a non-transitory computer-readable recording medium storing instructions.

A method for performing checkpointing for fault tolerance of an application is provided, which may be performed by one or more computing devices and include storing accelerator data associated with an application at a specific time point as a checkpoint, storing operation data associated with the application performed after the specific time point, and performing application fault tolerance based on the checkpoint and the stored operation data.

The storing the accelerator data associated with the application at the specific time point as the checkpoint may include updating a bit vector of the accelerator data in response to completing storing the checkpoint of the accelerator data.

The storing the accelerator data associated with the application at the specific time point as the checkpoint may further include receiving an operation execution message associated with an accelerator data while storing the accelerator data associated with the application as the checkpoint, and in response to the received operation execution message, executing an operation associated with the accelerator data.

The executing the operation associated with the accelerator data may include in response to not completing updating a bit vector of a first accelerator data, of the accelerator data, associated with a write access, suspending execution of an operation associated with the first accelerator data associated with the write access, and in response to completing updating a bit vector of a second accelerator data, of the accelerator data, associated with the write access, executing an operation associated with the second accelerator data associated with the write access, in which the operation associated with the first accelerator data and the operation associated with the second accelerator data are operations executable in parallel.

The operation execution message associated with the accelerator data may include an operation graph execution message of the application, and the operation graph execution message may include information classified in a time order of write access within a write access-associated accelerator data, of the accelerator data associated with the application.

The storing the accelerator data associated with the application at the specific time point as the checkpoint may include storing the write access-associated accelerator data, of the accelerator data, as a checkpoint using the time order of write access, and storing the write access-non-associated accelerator data, of the accelerator data, as a checkpoint.

The specific time point may be a time point that is repeated based on a predefined time period.

The specific time point may be a time point at which at least one predefined event occurs, including a time point at which a system resource usage exceeds a threshold, a time point at which each task associated with the application is completed, or a time point at which an error occurs.

A non-transitory computer-readable recording medium storing instructions for executing a method for performing checkpointing on a computer is provided.

An information processing system may include a communication module, a memory, and one or more processors connected to the memory and configured to execute one or more computer-readable programs included in the memory, in which the at least one program may include instructions for storing accelerator data associated with an application at a specific time point as a checkpoint, storing operation data associated with the application performed after the specific time point, and performing application fault tolerance based on the checkpoint and the stored operation data.

According to some embodiments of the present disclosure, by determining whether checkpointing is performed for each of a plurality of accelerator data by using a bit vector, and preferentially performing an operation on the accelerator data for which checkpointing is completed, it is possible to allow accelerator operation to proceed while also performing checkpointing, thereby reducing performance degradation during the process of performing checkpointing.

According to some examples of the present disclosure, by storing accelerator data for which write processing occurs in the accelerator operation process as checkpoints in the order of write access, the probability that checkpointing for accelerator data and accelerator operation processing are performed in an overlapping manner can be increased, thereby reducing performance degradation that occurs during the checkpointing process as the accelerator operation process is delayed.

The effects of the present disclosure are not limited to the effects described above, and other effects not described herein can be clearly understood by those of ordinary skill in the art (referred to as "ordinary technician") from the description of the claims.

BRIEF DESCRIPTION OF THE DRAWINGS

The above and other objects, features and advantages of the present disclosure will be described with reference to the accompanying drawings described below, where similar reference numerals indicate similar elements, but not limited thereto, in which:

FIG. 9 illustrates an example of a process of updating a bit vector for the accelerator data based on the time order of write access.

DETAILED DESCRIPTION

Figure 1:
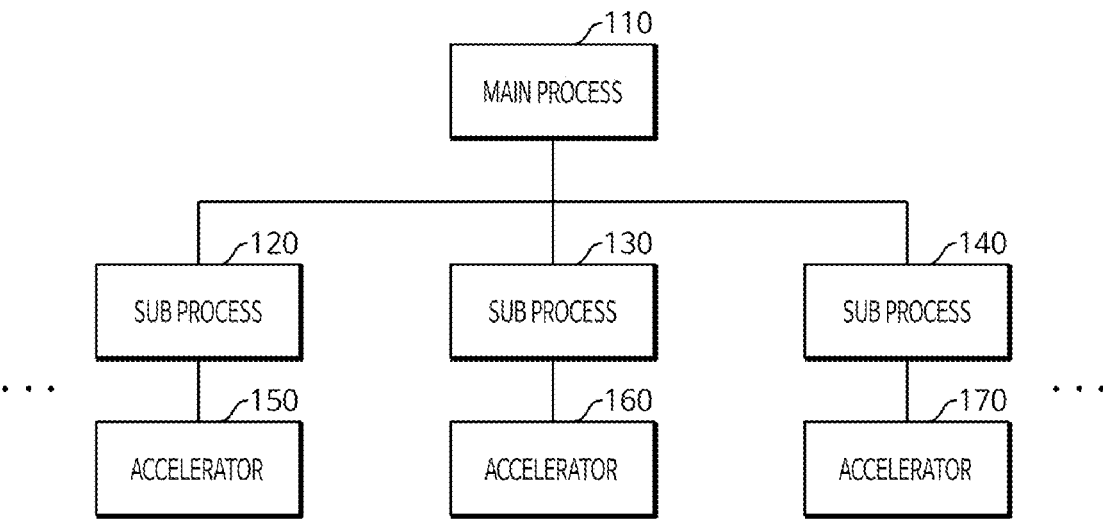
FIG. 1 illustrates an example of a main process and a sub process for fault tolerance of an application.

Hereinafter, example details for the practice of the present disclosure will be described in detail with reference to the accompanying drawings. However, in the following description, detailed descriptions of well-known functions or configurations will be omitted if it may make the subject matter of the present disclosure rather unclear.

In the accompanying drawings, the same or corresponding components are assigned the same reference numerals. In addition, in the following description of various examples, duplicate descriptions of the same or corresponding components may be omitted. However, even if descriptions of components are omitted, it is not intended that such components are not included in any example.

Advantages and features of the disclosed examples and methods of accomplishing the same will be apparent by referring to examples described below in connection with the accompanying drawings. However, the present disclosure is not limited to the examples disclosed below, and may be implemented in various forms different from each other, and the examples are merely provided to make the present disclosure complete, and to fully disclose the scope of the disclosure to those skilled in the art to which the present disclosure pertains.

The terms used herein will be briefly described prior to describing the disclosed example(s) in detail. The terms used herein have been selected as general terms which are widely used at present in consideration of the functions of the present disclosure, and this may be altered according to the intent of an operator skilled in the art, related practice, or introduction of new technology. In addition, in specific cases, certain terms may be arbitrarily selected by the applicant, and the meaning of the terms will be described in detail in a corresponding description of the example(s). Therefore, the terms used in the present disclosure should be defined based on the meaning of the terms and the overall content of the present disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it is intended as meaning that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to play one or more processors. Accordingly, as an example, the "module" or "unit" may include components such as software components, object-oriented software components, class components, and task components, and at least one of processes, functions, attributes, procedures, subroutines, program code segments, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

The "module" or "unit" may be implemented as a processor and a memory. The "processor" should be broadly interpreted to include general-purpose processors, central processing units (CPUs), microprocessors, digital signal processors (DSPs), controllers, microcontrollers, state machines, accelerators (e.g., AI accelerators, AI data accelerators, tensor data accelerators, etc.), etc. Under some circumstances, the "processor" may refer to an application-specific integrated circuit (ASIC), a programmable logic device (PLD), a field-programmable gate array (FPGA), and so on. The "processor" may refer to a combination of processing devices, e.g., a combination of a DSP and a microprocessor, a combination of a plurality of microprocessors, a combination of one or more microprocessors in combination with a DSP core, a combination of any accelerators, or a combination of any other such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EE-PROM), flash memory, magnetic or optical data storage, registers, and so on. The memory is said to be in electronic communication with a processor if the processor can read information from and/or write information to the memory. The memory integrated with the processor is in electronic communication with the processor.

In the present disclosure, a "system" may refer to at least one of a server device and a cloud device, but is not limited thereto. For example, the system may include one or more server devices. In another example, the system may include one or more cloud devices. In still another example, the system may include both the server device and the cloud device operated in conjunction with each other.

In the present disclosure, "each of a plurality of A" may refer to each of all components included in the plurality of A, or may refer to each of some of the components included in a plurality of A.

In the present disclosure, "application" or "program" may refer to a program that performs processes including operations, etc. associated with a machine learning model and/or an artificial neural network model. For example, the application or program may refer to a program associated with deep learning operation.

In the examples of the present disclosure, "artificial intelligence operation" may refer to any operation associated with a machine learning model (e.g., an artificial neural network model, etc.). For example, an artificial intelligence operation may be an operation performed in each layer included in an artificial neural network model. For example, the artificial intelligence operation may include an addition operation, a subtraction operation, a maximum value calculation operation, a minimum value calculation operation, a floating point multiplication operation, weighting operation, convolution operation, matrix multiplication operation, batch normalization operation, Rectified Linear Unit (ReLU) operation, pooling operation, Long Short-Term Memory (LSTM) operation, Gated Recurrent Unit (GRU) operation, etc. performed in a layer included in an artificial neural network model, but is not limited thereto.

In the present disclosure, an "operation graph" or an "intermediate representation graph" may refer to a graph that is generated to efficiently execute a program and has the same meaning as a program and/or information associated therewith. For example, the operation graph or intermediate representation graph may include information about input and output data for artificial intelligence operation, operation sequence, etc. The operation graph or intermediate representation graph may be represented by one or more nodes and one or more edges.

In the present disclosure, "accelerator data associated with the write access", "write access-associated accelerator data" or "write access accelerator data" may refer to accelerator data for which at least one write access is present in the compiled operation graph (that is, the operation graph running on the accelerator). In addition, in the present disclosure, "accelerator data not associated with the write access", "write access-non-associated accelerator data" or "accelerator data associated with read access" may refer to accelerator data for which no write access is present in the compiled operation graph.

An "accelerator" may herein refer to any processor or circuitry that performs artificial intelligence operations (e.g., AI accelerators, AI data accelerators, tensor data accelerators, etc.). For example, the accelerator may refer to a processor or circuitry capable of performing artificial intelligence operations quickly, and may include a graphics processing unit (GPU), a neural processing unit (NPU), a tensor processing unit (TPU), etc., for example, but is not limited thereto.

In the present disclosure, "process" may mean an instance of an application or program running on a computer. The process may be managed by the operating system and include a set of code allocated to a memory, data, and execution state, etc. Separate software may be provided for control and management of processes through the device.

In the present disclosure, "fault tolerance" may refer to the ability of a system to operate smoothly and perform functions without interruption even if a fault occurs due to internal or external factors. For example, a "fault tolerance method" may refer to a method and/or procedure of a system operating smoothly and performing functions without interruption even if a fault occurs due to internal or external factors.

In the present disclosure, "checkpoint" relates to the function of storing or writing the execution state of a program and later resuming execution from that state, and the checkpoint may refer to storing or writing the execution state of a program or system.

FIG. 1 illustrates an example of a main process 110 and sub processes 120, 130, and 140 for fault tolerance of an application. In response to an application execution command, a processor (one or more processors of an information processing system) may execute the main process 110 and a plurality of sub processes 120, 130, and 140 of an application (e.g., a software application, a computer program, etc. that is associated with a plurality of devices, such as GPUS, NPUs, AI processors, etc.). The main process 110 is an instance of a program executed on a computing device, that is, an instance of an application (e.g., an application process, such as an application process associated with machine learning, an application process associated with deep learning, an application process associated with an artificial intelligence (AI) framework, a deep learning framework, and/or a machine learning framework, such as PyTorch, etc.), and may include a set of codes allocated to a memory, data, and execution states. For example, the main process 110 may process the tasks of the application, communicate with other processes or the operating system to exchange data and interact therewith, and process errors and/or exceptions that may occur during the application execution. In addition, the plurality of sub processes 120, 130, and 140 may be the processes that actually perform operations using a plurality of accelerators 150, 160, and 170 in relation to the application execution.

Each of the plurality of sub processes 120, 130, and 140 may be a process for each of the plurality of accelerators 150, 160, and 170 associated with the application. The plurality of accelerators 150, 160, and 170 may refer to a Graphic Processing Unit (GPU), etc., but are not limited thereto. Specifically, the processor may generate a sub process and map a corresponding accelerator.

The processor may perform checkpointing for each of the data associated with the plurality of accelerators 150, 160, and 170 for fault tolerance while the application is running. For example, using a bit vector, the processor may determine whether checkpointing for each of the data associated with the plurality of accelerators 150, 160, and 170 is performed, and perform an operation on accelerator data for which checkpointing is completed. In this case, checkpointing for each of the plurality of accelerator data may be performed in parallel with the accelerator operation.

The stored checkpoint may be used when performing fault tolerance associated with the application execution. Specifically, if a failure occurs in any one of the plurality of accelerators 150, 160, and 170 that actually perform operations, the processor may use the latest checkpoint to allow an idle accelerator to perform tasks corresponding to the tasks of the sub process associated with the failed accelerator, thereby allowing the task to continue with minimal impact on the running of the application.

Through this, by preferentially performing an operation on the accelerator data for which checkpointing is completed, it is possible to allow accelerator operation to proceed while also performing checkpointing, thereby reducing performance degradation during the process of performing checkpointing.

FIG. 1 illustrates three accelerators 150, 160, and 170 as an example of a plurality of accelerators, but the number of accelerators is not limited thereto, and the number of accelerators may be more or less than the number of accelerators illustrated.

Figure 2:
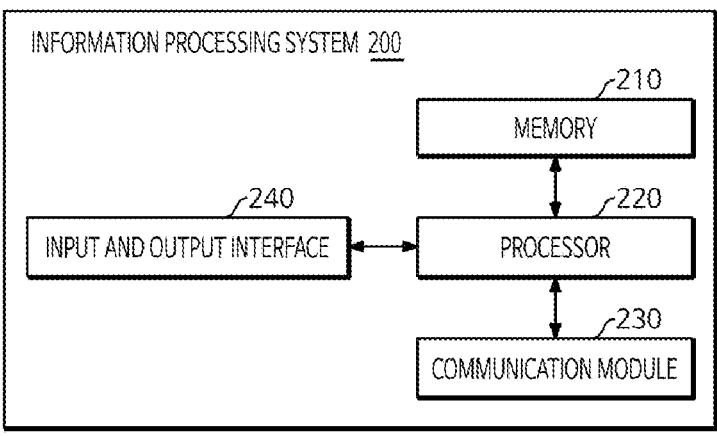
FIG. 2 is a block diagram illustrating an internal configuration of an information processing system.

FIG. 2 is a block diagram illustrating an internal configuration of an information processing system 200. The information processing system 200 may include a memory 210, a processor 220, a communication module 230, and an input and output interface 240. The information processing system 200 may be configured to communicate information and/or data through a network using the communication module 230.

The memory 210 may include any computer readable medium. The memory 210 may include a non-transitory computer readable recording medium, and may include a permanent mass storage device such as read only memory (ROM), disk drive, solid state drive (SSD), flash memory, etc. In another example, a non-destructive mass storage device such as ROM, SSD, flash memory, disk drive, and so on may be included in the information processing system 200 as a separate permanent storage device that is distinct from the memory. In addition, the memory 210 may store an operating system and at least one program code (e.g., a code for executing checkpointing on accelerator data, etc.).

These software components may be loaded from a computer-readable recording medium separate from the memory 210. Such a separate computer-readable recording medium may include a recording medium directly connectable to the information processing system 200, and may include a computer-readable recording medium such as a floppy drive, a disk, a tape, a DVD/CD-ROM drive, a memory card, etc., for example. In another example, the software components may be loaded into the memory 210 through the communication module 230 rather than the computer-readable recording medium. For example, at least one program may be loaded into the memory 210 based on a computer program (e.g., a program for executing checkpointing on accelerator data, etc.) installed by files provided by developers or a file distribution system that distributes application installation files through the communication module 230.

The processor 220 may be configured to process the instructions of the computer program by performing basic arithmetic, logic, and input and output operations. The processor 220 may include a plurality of processors. For example, the processor 220 may include some or all of a processor and a plurality of devices for executing the main process and executing and managing the sub processes. Alternatively, instead of being included in the information processing system 200, a plurality of devices may be included in a separate device or system that can be accessed or communicated through the communication module 230. The commands may be provided to a user terminal (not illustrated) or another external system by the memory 210 or the communication module 230. For example, the processor 220 may provide checkpointing performance state information or accelerator failure information to the user terminal.

The communication module 230 may provide a configuration or function for the user terminal (not illustrated) and the information processing system 200 to communicate with each other through a network, and may provide a configuration or function for the information processing system 200 to communicate with an external system (e.g., a separate cloud system). For example, control signals, commands, data, and the like provided under the control of the processor 220 of the information processing system 200 may be transmitted to the user terminal and/or the external system through the communication module 230 and the network through the communication module of the user terminal and/or an external system. For example, the processor 220 may transmit the checkpointing performance state information or accelerator failure information to the user terminal through the communication module 230.

In addition, the input and output interface 240 of the information processing system 200 may be a means for interfacing with a device (not illustrated) for inputting or outputting, which may be connected to the information processing system 200 or included in the information processing system 200. In FIG. 2, the input and output interface 240 is illustrated as a component configured separately from the processor 220, but aspects are not limited thereto, and the input and output interface 240 may be configured to be included in the processor 220. The information processing system 200 may include more components than those illustrated in FIG. 2. Meanwhile, most of the related components may not necessarily require exact illustration.

The processor 220 of the information processing system 200 may be configured to manage, process, and/or store the information and/or data received from a plurality of user terminals and/or a plurality of external systems. In response to a checkpoint execution command, the processor 220 may store the accelerator data associated with an application as a checkpoint.

Figure 3:
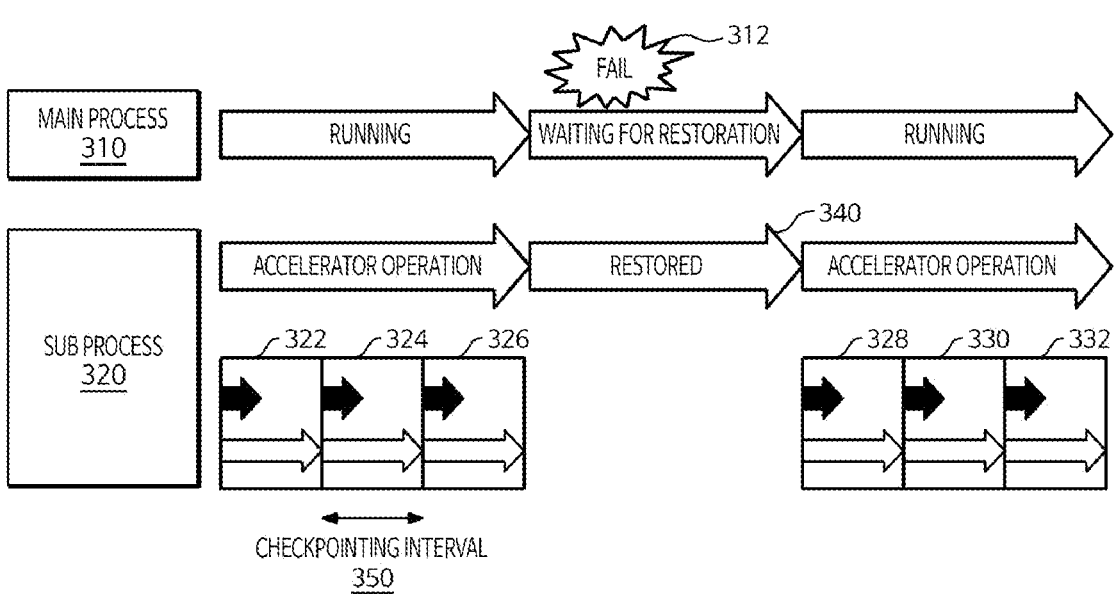
FIG. 3 illustrates an example of performing fault tolerance of an application when a failure occurs while the application is running.

FIG. 3 illustrates an example of performing fault tolerance of an application if a failure occurs while the application is running. In response to an application execution command, the processor (e.g., one or more processor of the information processing system) may execute a main process 310 and a sub process 320. The main process 310 is an instance of a program executed on a computing device, that is, an instance of an application, and may process tasks to be performed by the application, and communicate with other processes or the operating system to exchange data and interact therewith. In addition, the sub process 320 may be a process that actually performs an operation using one or more accelerators in relation to the execution of an application. The sub process 320 may refer to a sub process 320 associated with each of one or more accelerators. For example, a first accelerator may be mapped with a first sub process and executed, and a second accelerator may be mapped with a second sub process and executed.

The processor may store, as a checkpoint, accelerator data associated with the application at a specific time point. In addition, the processor may store operation data associated with the application performed after the checkpointing.

The accelerator data may refer to tensor data processed by an accelerator (e.g., GPU), but is not limited thereto. In addition, the operation data may include input data, the operation itself, and/or result data of performing the operation. Referring to FIG. 3, examples 322, 324, 326, 328, 330, and 332 are shown, in which checkpoints (e.g., black arrows) and operation data (e.g., white arrows) for the accelerator data associated with a specific accelerator are stored in each checkpointing interval 350. The checkpointing interval 350 may be a time interval (e.g., 1 hour interval, etc.) set by the user, but embodiments are not limited thereto.

The processor may perform the fault tolerance using the latest checkpoint, if a failure 312 associated with the accelerator occurs. In this case, the processor may perform restoration 340 for the failure 312 by switching a task associated with the failed accelerator to the idle accelerator and executing the same. For example, the processor may execute a sub process for the idle accelerator, if the failure 312 associated with the specific accelerator occurs. The processor may load the latest checkpoint into a memory of the idle accelerator. The processor may re-execute all the operation data performed after the latest checkpoint using the operation data stored with the idle accelerator.

Figure 4:
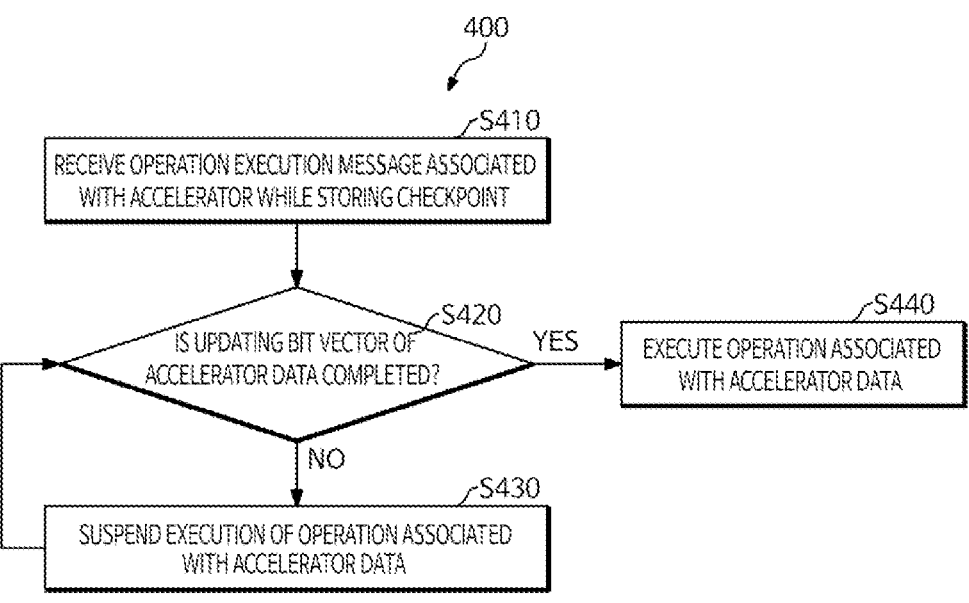
FIG. 4 is a flowchart illustrating an example of a method for executing an operation associated with an accelerator while performing checkpointing associated with a specific accelerator.

FIG. 4 is a flowchart illustrating an example of a method 400 for executing an operation associated with an accelerator while performing checkpointing associated with a specific accelerator. While storing accelerator data associated with a specific accelerator as a checkpoint, the method 400 may initiated by a processor (e.g., one or more processors of an information processing system) receiving an operation execution message associated with the accelerator, at S410. The operation associated with the accelerator may be an operation associated with a plurality of accelerators including the operation associated with the specific accelerator.

In this case, the process of storing the accelerator data as a checkpoint may include a process of updating a bit vector of the accelerator data. For example, if storing checkpoint of the specific accelerator data is completed, the processor may set the bit vector that is set to "0" for the specific accelerator data to "1" so as to update the bit vector of the specific accelerator data.

The processor may determine whether updating the bit vector of the accelerator data is completed in order to execute an operation associated with the accelerator, at S420. In this case, the accelerator data may be the accelerator data associated with the write access. For example, if updating the bit vector of the specific accelerator data associated with the write access is not completed, the processor may suspend the execution of the operation associated with the specific accelerator data associated with the write access, at S430. In addition, if updating the bit vector of the specific accelerator data associated with the write access is completed, the processor may execute the operation associated with the specific accelerator data associated with the write access, at S440. In another example, the processor may execute the operation on the accelerator data not associated with the write access (e.g., accelerator data associated with a read access), regardless of whether checkpointing is completed on the accelerator data not associated with the write access.

The flowchart illustrated in FIG. 4 and the corresponding description above are examples of receiving an operation associated with a specific accelerator, but if an operation associated with a plurality of accelerators is received, one or more steps may be performed simultaneously or in an overlapping manner, or one or more steps may be performed repeatedly multiple times.

Figure 5:
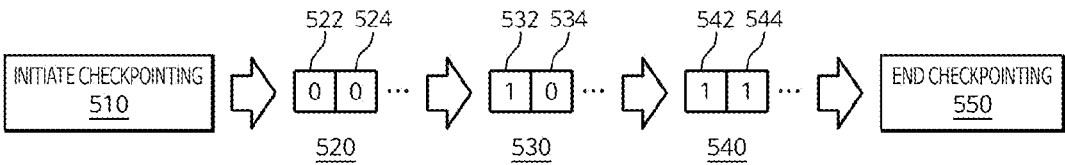
FIG. 5 illustrates an example of a process of updating a bit vector of accelerator data after checkpointing of accelerator data is initiated.

FIG. 5 illustrates an example of a process of updating a bit vector of accelerator data after checkpointing of accelerator data is initiated (510). If the checkpointing interval arrives and checkpointing is initiated (510), the processor may store checkpoint for each accelerator data. If storing checkpoints for each accelerator data is completed, the processor may update a bit vector corresponding to the stored accelerator data.

The value of the bit vector corresponding to the accelerator data may be used to determine whether writing the corresponding accelerator data is completed. For example, if a value of a bit vector corresponding to specific accelerator data is set to "0", the processor may determine that writing for the corresponding accelerator data is not completed. In addition, if the value of the bit vector corresponding to the specific accelerator data is set to "1", the processor may determine that writing for the corresponding accelerator data is completed.

As a specific example, the value of the bit vector corresponding to each of the plurality of accelerator data may be updated through first to third states 520, 530, and 540. The first state 520 represents an example of a value of a bit vector corresponding to accelerator data at a first time point after the arrival of the checkpointing interval, when writing for the plurality of accelerator data is not yet completed. For example, if storing checkpoint is not yet completed for each of a plurality of accelerator data after the arrival of the checkpointing interval, the value of a first bit vector 522 for the first accelerator data at the first time point may be in a state of being set to "0". The value of a second bit vector 524 for the second accelerator data at the first time point may also in the state of being set to "0".

The second state 530 represents an example of a value of a bit vector corresponding to each of a plurality of accelerator data at a second time point after the first state 520, when writing for the first accelerator data is completed. For example, if writing for the first accelerator data is completed after the first state 520, the value of a first bit vector 532 for the first accelerator data at the second time point may be in the updated state "1". On the other hand, the value of a second bit vector 534 for the second accelerator data for which writing is not completed at the second time point may still be in the state of being set to "0".

The third state 540 represents an example of a value of a bit vector corresponding to each of a plurality of accelerator data at a third time point after the second state 530, when writing for the second accelerator data is completed. For example, if writing for the second accelerator data is completed after the second state 530, the value of a second bit vector 544 corresponding to the second accelerator data at the third time point may be in the updated state "1". In addition, the value of a first bit vector 542 corresponding to the first accelerator data at the third time point may remain in the updated state "1".

If the checkpointing interval arrives and writing for each of a plurality of accelerator data is completed, checkpointing in the corresponding interval may end (550). In this case, if the next checkpointing interval arrives, the value of the bit vector for each of the plurality of accelerator data may be updated to "0" in order to determine whether writing for each of the plurality of accelerator data is completed in the corresponding checkpointing interval.

FIG. 5 illustrates an example in which the value of a bit vector for two accelerator data are updated for convenience of description, but the number of accelerator data and the number of bit vectors corresponding to each accelerator data are not limited thereto and may be more or less.

Figure 6:
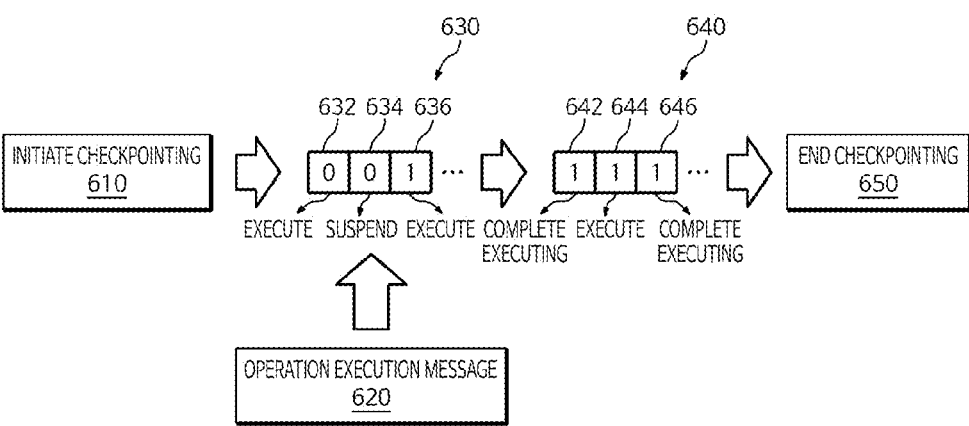
FIG. 6 illustrates an example of a method for performing an accelerator operation if there is an operation execution command while a checkpoint of accelerator data is being stored.

FIG. 6 illustrates an example of a method for performing an accelerator operation if there is an operation execution command while a checkpoint of accelerator data is being stored. A processor (e.g., one or more processors of an information processing system) may receive an operation execution message 620 after a checkpointing interval arrives and checkpointing is initiated (610). In this case, with respect to the accelerator data associated with the write access, the processor may determine whether updating the bit vector of the accelerator data associated with the write access is completed, and execute an operation on the accelerator data associated with the write access based on the determination. Additionally, with respect to the accelerator data not associated with the write access, the processor may execute an operation on the accelerator data not associated with the write access without determining whether updating the bit vector of the accelerator data not associated with the write access is completed.

For example, the processor may suspend execution of an operation associated with the specific accelerator data associated with the write access, if the bit vector of the specific accelerator data associated with the write access is not updated. In this case, the processor may preferentially execute an operation on the accelerator data associated with another write access in which the bit vector is updated. In addition, in the case of specific accelerator data associated with read access, unlike the accelerator data associated with the write access, the processor may execute an operation associated with specific accelerator data associated with the read access even if the bit vector is not updated.

As a specific example, if an operation execution message (620) is received after checkpointing is initiated (610), first and second states 630 and 640 represent examples in which an operation associated with the accelerator data is suspended or preferentially executed based on the type of data associated with a specific accelerator (e.g., accelerator data associated with the write access, accelerator data associated with read access) and the value of the bit vector corresponding to each of the plurality of accelerator data.

Each of the plurality of accelerator data may refer to data associated with the read access or data associated with the write access. For example, in the first and second states 630 and 640, first bit vectors 632 and 642 may be bit vectors corresponding to first accelerator data associated with the read access. In addition, each of second bit vectors 634 and 644 and third bit vectors 636 and 646 may be a bit vector corresponding to second accelerator data and third accelerator data associated with the write access.

The first state 630 represents an example in which an accelerator operation is suspended for the second accelerator data associated with the write access, if the operation execution message 620 is received after checkpointing is initiated (610).

For example, if the operation execution message 620 is received after checkpointing is initiated (610), since writing for the first accelerator data associated with the read access is not yet completed, the first bit vector 632 for the first accelerator data may be "0". Likewise, since writing for the second accelerator data associated with the write access is not yet completed, the second bit vector 634 for the second accelerator data may be "0". On the other hand, since writing for the third accelerator data associated with the write access is preferentially completed, the value of the third bit vector 636 for the third accelerator data may be "1".

In this case, in the case of the first accelerator data associated with the read access, the processor may process the execution of the operation on the first accelerator data regardless of whether checkpointing is completed. In addition, the processor may preferentially process an operation on the third accelerator data associated with the write access for which checkpointing is completed, and may suspend execution of an operation on the second accelerator data.

The second state 640 represents an example of performing an operation on the second accelerator data after the first state 630, if writing for the second accelerator data associated with the write access is completed. For example, if writing for the second accelerator data associated with the write access is completed after the first state 630 so that the value of the second bit vector 644 of the second accelerator data is updated to "1", the processor may process execution of an operation on the second accelerator data. In this case, checkpointing writing for the third accelerator data is already completed, and the value of the third bit vector 646 for the third accelerator data may remain to be "1".

Meanwhile, in the second state 640 of FIG. 6, although it is illustrated that writing for the first accelerator data associated with the read access is completed and the value of the first bit vector 642 for the first accelerator data is updated to "1", this is merely an example provided to show that, for the accelerator data associated with the read access, the operation can be executed regardless of whether checkpointing is performed or not, and writing for the first accelerator data associated with the read access may be performed before or after checkpointing the corresponding accelerator data.

After the second state 640, if writing for each of the plurality of accelerator data is completed, checkpointing in the corresponding interval may end (650).

FIG. 6 illustrates an example in which the value of a bit vector for three accelerator data are updated for convenience of description, but the number of accelerator data and the number of bit vectors corresponding to each accelerator data are not limited thereto and may be more or less.

Figure 7:
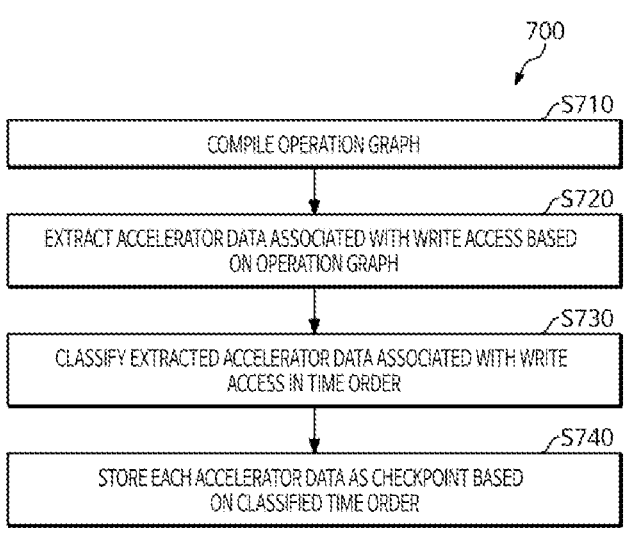
FIG. 7 is a flowchart illustrating an example of a method for storing accelerator data as a checkpoint based on the time order of write access of accelerator data associated with an application.

FIG. 7 is a flowchart illustrating an example of a method 700 for storing accelerator data as a checkpoint based on the time order of write access of accelerator data associated with an application. The method 700 may be initiated by a processor (e.g., one or more processors of an information processing system) compiling an operation graph (e.g., an intermediate representation graph) associated with an application, at S710. The processor may extract accelerator data associated with the write access based on the operation graph, at S720. For example, the processor may classify the accelerator data associated with the write access and the accelerator data not associated with the write access (e.g., the accelerator data associated with the read access) based on the operation graph.

The processor may sort and classify the extracted accelerator data associated with the write access in time order, at S730. The processor may store each accelerator data as a checkpoint based on the classified time order, at S740. For example, the processor may store, as checkpoints in the time order, the accelerator data associated with the write accesses classified in the time order. The processor may sequentially store, as checkpoints, the accelerator data not associated with the write access.

Through this, the accelerator data for which write process occurs during the accelerator operation process is preferentially stored as a checkpoint, so that checkpointing the accelerator data and the accelerator operation process may be performed simultaneously. This increases the probability that the accelerator operation process is performed in an overlapping manner without being delayed by checkpointing, thereby reducing performance degradation that occurs due to the delay in the accelerator operation process during the checkpointing process.

Figure 8:
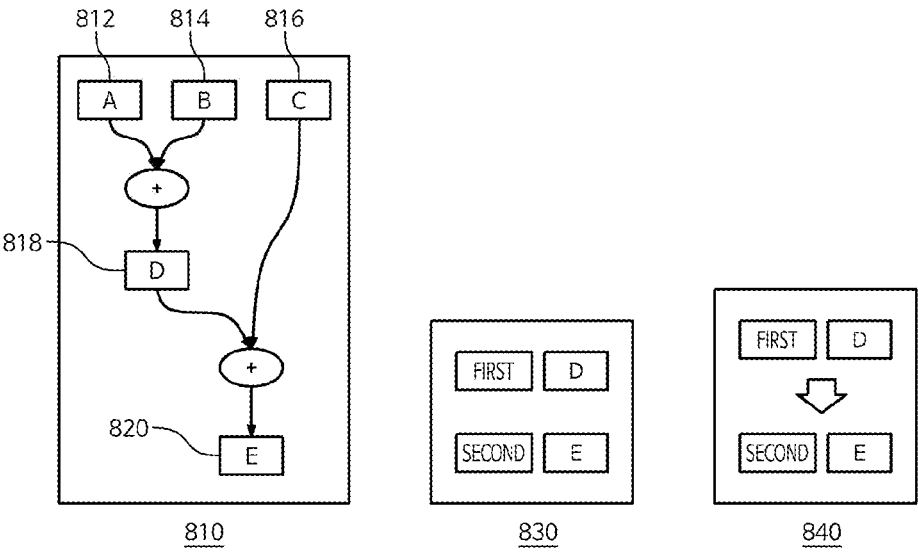
FIG. 8 is a diagram conceptually illustrating a process of determining the order of checkpointing for the accelerator data based on the time order of write access of the accelerator data associated with an application.

FIG. 8 is a diagram conceptually illustrating a process of determining the order of checkpointing for the accelerator data based on the time order of write access of the accelerator data associated with an application. The process of determining the checkpointing order of accelerator data based on the time order of write access of the accelerator data may be performed through first to third examples 810, 830, and 840.

The first example 810 represents an example of an operational graph (e.g., intermediate representation graph) that includes accelerator data associated with the write access. For example, for a series of operations including "A+B=D" and "D+C=E" included in the operation graph, a processor (e.g., one or more processors of an information processing system) may extract information on accelerator data D (e.g., tensor D) 818 and accelerator data E (e.g., tensor E) 820 associated with the write access, and accelerator data A (e.g., tensor A) 812, accelerator data B (e.g., tensor B) 814, and accelerator data C (e.g., tensor C) 816 not associated with the write access.

The second example 830 illustrates an example of a table including information including accelerator data classified according to the time order of write access. For example, according to a series of operations including "A+B=D" and "D+C=E" included in the operation graph of the first example 810, since the accelerator data D (e.g., 818) and the accelerator data E (e.g., 820) are sequentially added as the result data of the "+" operation, the processor may sort the accelerator data associated with the write access in the order of accelerator data D and the accelerator data E according to the time order of write access and store the result in a table.

The third example 840 illustrates an example in which a plurality of accelerator data is stored as checkpoints according to the time order of write access. For example, if checkpointing interval arrives, the accelerator data D and the accelerator data E may be respectively stored as checkpoints according to the time order of write access.

The accelerator data not associated with the write access (e.g., the accelerator data associated with the read access) may be stored as a checkpoint after the accelerator data associated with the write access is stored as a checkpoint. For example, the accelerator data A (e.g., tensor A) (e.g., 812), the accelerator data B (e.g., tensor B) (e.g., 814) and the accelerator data C (e.g., tensor C) (e.g., 816) not associated with the write access may be stored as checkpoints after the accelerator data D (e.g., tensor D) (e.g., 818) and the accelerator data E (e.g., tensor E) (e.g., 820) associated with the write access are stored as checkpoints.

Figure 9:
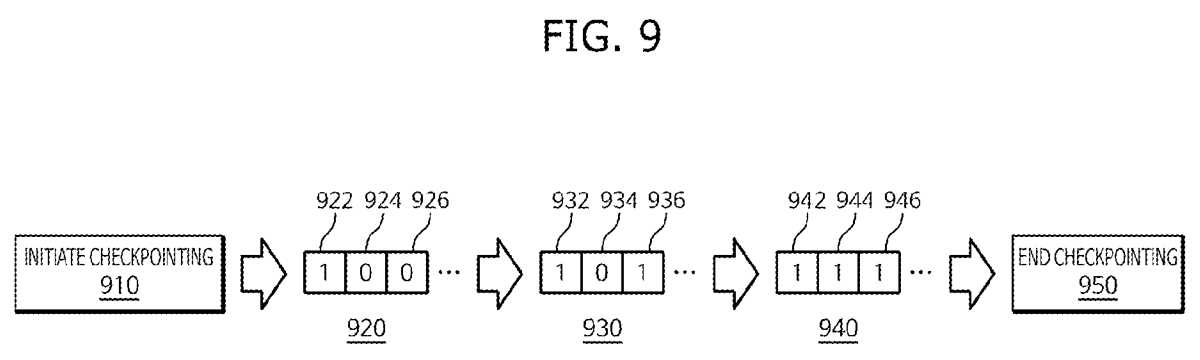

FIG. 9 illustrates an example of a process of updating a bit vector for the accelerator data based on the time order of write access. If the checkpointing interval arrives and checkpointing is initiated (910), the processor may perform storing checkpoints according to the time order of write access for each accelerator data associated with the write access. Storing the checkpoint may be sequentially performed for the accelerator data not associated with the write access (e.g., the accelerator data associated with the read access). If storing the checkpoint for each accelerator data is completed, the processor may update a bit vector corresponding to the stored accelerator data.

As a specific example, the value of the bit vector corresponding to each accelerator data may be updated through first to third states 920, 930, and 940 according to the time order of write access of the accelerator data. The example illustrated in FIG. 9 illustrates an example of a process of updating value of a bit vector for any accelerator data A, B, and C. For example, in the example illustrated in FIG. 9, it is assumed that the accelerator data A that is the first in the time order of write access is associated with first bit vectors 922, 932, and 936, the accelerator data B that is the second in the time order of write access is associated with third bit vectors 926, 936, and 946, and the accelerator data C not associated with the write access is associated with second bit vectors 924, 934, and 944.

The first state 920 represents an example of a state in which a value of the first bit vector 922 for the accelerator data A associated with the write access, which is the first in the time order of write access, is updated. For example, after the arrival of the checkpointing interval, the processor may preferentially process storing checkpoint for the accelerator data A that is the first in the time order of write access. In this case, the value of the first bit vector 922 at the first time point associated with the accelerator data A associated with the write access may be updated to "1". In addition, the value of the third bit vector 926 associated with the accelerator data B associated with the write access, for which storing checkpoint is not performed, at the first time point, and the value of the second bit vector 924 associated with the accelerator data C not associated with the write access at the first time point may be "0".

The second state 930 represents an example of a state in which, after the first state 920, the value of the third bit vector 936 for the accelerator data B associated with the write access, which is the second in the time order of write access, is updated. For example, after the first state 920, the processor may process storing checkpoint for the accelerator data B that is the second in the time order of write access. In this case, the value of the third bit vector 936 associated with the accelerator data B associated with the write access at the second time point may be updated to "1". In addition, the value of the first bit vector 932 associated with the accelerator data A for which storing checkpoint is completed, at the second time point may remain to be "1", and the value of the second bit vector 934 associated with the accelerator data C not associated with the write access for which storing checkpoint is not yet performed, at the second time point may be "0".

The third state 940 represents an example of a state after the second state 930, in which the value of the second bit vector 944 for the accelerator data C not associated with the write access is updated. For example, after the second state 930, the processor may process storing checkpoint for the accelerator data C not associated with the write access. In this case, the value of the second bit vector 944 associated with the accelerator data C at the third time point may be updated to "1". In addition, the value of the first bit vector 942 associated with the accelerator data A associated with the write access for which storing checkpoint is completed, at the third time point, and the value of the third bit vector

946 associated with the accelerator data B associated with the write access at the third time point may remain to be "1".

If the checkpointing interval arrives and writing for each of a plurality of accelerator data is completed, checkpointing in the corresponding interval may end (950). In this case, if the next checkpointing interval arrives, the value of the bit vector for each of the plurality of accelerator data may be updated to "0" in order to determine whether recording of each of the plurality of accelerator data is completed in the corresponding checkpointing interval.

FIG. 9 illustrates an example in which the value of a bit vector for three accelerator data are updated for convenience of description, but the number of accelerator data and the number of bit vectors corresponding to each accelerator data are not limited thereto and may be more or less.

Figure 10:
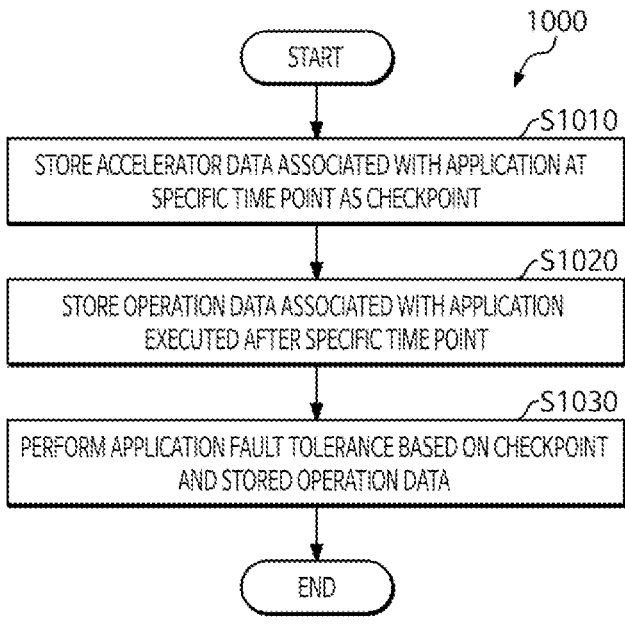
FIG. 10 is a flowchart illustrating an example of a method for performing checkpointing for fault tolerance of an application.

FIG. 10 is a flowchart illustrating an example of a method 1000 for performing checkpointing for fault tolerance of an application. The method 1000 may be initiated by a processor (e.g., one or more processors of an information processing system) storing, as a checkpoint, accelerator data associated with an application at a specific time point, at S1010. The specific time point may be a time point that is repeated based on a predefined time period. In another example, the specific time point may be a time point at which at least one predefined event occurs, such as the system resource usage exceeding a threshold, completion of each task associated with the application, or occurrence of an error. These events may be set in advance. The processor may update a bit vector of the accelerator data, in response to completing storing the checkpoint of the accelerator data.

In addition, the processor may store the operation data associated with the application executed after a specific time point, at S1020. The processor may perform application fault tolerance based on the checkpoint and the stored operation data, at S1030.

The processor may receive an operation execution message associated with the accelerator data while storing the accelerator data associated with the application as a checkpoint. The processor may execute the operation associated with the accelerator data in response to the received operation execution message.

The processor may preferentially execute the operation associated with the accelerator data for which updating a bit vector is completed first. For example, the processor may suspend execution of the operation associated with the first accelerator data associated with the write access, in response to not completing updating the bit vector of the first accelerator data, of the accelerator data, associated with the write access. In addition, the processor may execute the operation associated with the second accelerator data associated with the write access, in response to completing updating the bit vector of the second accelerator data, of the accelerator data, associated with the write access. The operation associated with the first accelerator data and the operation associated with the second accelerator data may be operations executable in parallel.

The processor may store the write access-associated accelerator data, of the accelerator data, as a checkpoint using the time order of write access. The processor may store the write access-non-associated accelerator data, of the accelerator data, as a checkpoint. In this case, the operation execution message associated with the accelerator data may include an operation graph execution message of the application. In addition, the operation graph execution message may include information classified in the time order of write access within a write access-associated accelerator data of the accelerator data associated with the application.

The flowchart illustrated in FIG. 10 and the above description are merely examples, and may be implemented differently in some other examples. For example, one or more operations may be omitted or implemented by a different configuration, the order of operations may be changed, one or more operations may be performed simultaneously or in parallel, or one or more operations may be performed repeatedly multiple times.

The method described above may be provided as a computer program stored in a computer-readable recording medium for execution on a computer. The medium may be a type of medium that continuously stores a program executable by a computer, or temporarily stores the program for execution or download. In addition, the medium may be a variety of writing means or storage means having a single piece of hardware or a combination of several pieces of hardware, and is not limited to a medium that is directly connected to any computer system, and accordingly, may be present on a network in a distributed manner. An example of the medium includes a medium configured to store program instructions, including a magnetic medium such as a hard disk, a floppy disk, and a magnetic tape, an optical medium such as a CD-ROM and a DVD, a magnetic-optical medium such as a floptical disk, and a ROM, a RAM, a flash memory, etc. In addition, other examples of the medium may include an app store that distributes applications, a site that supplies or distributes various software, and a recording medium or a storage medium managed by a server.

The methods, operations, or techniques of the present disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies according to design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the present disclosure, computer, or a combination thereof.

Accordingly, various example logic blocks, modules, and circuits described in connection with the present disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EE-PROM), flash memory, compact disc (CD), magnetic or optical data storage devices, etc. The instructions may be executable by one or more processors, and may cause the processor(s) to perform certain aspects of the functions described in the present disclosure.

Although the examples described above have been described as utilizing aspects of the currently disclosed subject matter in one or more standalone computer systems, aspects are not limited thereto, and may be implemented in conjunction with any computing environment, such as a network or distributed computing environment. Furthermore, the aspects of the subject matter in the present disclosure may be implemented in multiple processing chips or devices, and storage may be similarly influenced across a plurality of devices. Such devices may include PCs, network servers, and portable devices.

Although the present disclosure has been described in connection with some examples herein, various modifications and changes can be made without departing from the scope of the present disclosure, which can be understood by those skilled in the art to which the present disclosure pertains. In addition, such modifications and changes should be considered within the scope of the claims appended herein.

The invention claimed is:

1. A method performed by one or more computing devices, the method comprising:
   storing, at a first time point, at least one checkpoint of application data of an application, wherein a first subset of the application data corresponds to write access;
   executing, based on an operation execution message associated with the application data, an operation associated with the application data by:
       based on a first completion status of a first vector of the first subset of the application data, suspending execution of an operation associated with the first subset of the application data; and
       based on a second completion status of a second vector of a second subset of the application data, executing an operation associated with the second subset of the application data, wherein the operation associated with the first subset of the application data and the operation associated with the second subset of the application data are executable in parallel;
   storing, after the first time point, operation data that indicates one or more operations performed by the application after the first time point; and
   performing, based on one of the at least one checkpoint and the stored operation data, application fault tolerance.

2. The method according to claim 1, wherein the storing the application data comprises updating, after storing the application data, one or more of the first vector or the second vector.

3. The method according to claim 1, wherein the operation execution message is received while storing the application data.

4. The method according to claim 1, wherein the second subset of the application data is associated with the write access.

5. The method according to claim 1, wherein the operation execution message associated with the application data comprises an operation graph execution message of the application, and wherein the operation graph execution message comprises information classified in a time order of write access within first subset of the application data, of the application data, associated with write access.

6. The method according to claim 1,
   wherein the storing the application data comprises:
   storing, using a time order of the write access, the first subset of the application data as a first checkpoint; and
   storing, after the storing of the first subset of the application data, the second subset of the application data as a second checkpoint.

7. The method according to claim 1, further comprising:
   selecting the first time point from a plurality of periodic time points that are recurring based on a predefined time interval.

8. The method according to claim 1, wherein the first time point is based on an occurrence of one or more of:
   a system resource usage exceeding a threshold,
   each task associated with the application being completed, or
   a fault comprising an error associated with an application process of the application.

9. The method according to claim 1, wherein a first checkpoint of the at least one checkpoint is a last checkpoint before an occurrence of a fault.

10. A non-transitory computer-readable medium storing instructions that, when executed by one or more processors, cause performance of the method according to claim 1.

11. An information processing system, comprising:
    a communication device;
    one or more processors; and
    memory storing instructions that, when executed by the one or more processors, cause the information processing system to:
        store, at a first time point, at least one checkpoint of application data of an application, wherein a first subset of the application data corresponds to write access;
        execute, based on an operation execution message associated with the application data, an operation associated with the application data by:
            based on a first completion status of a first vector of the first subset of the application data, suspending execution of an operation associated with the first subset of the application data; and
            based on a second completion status of a second vector of a second subset of the application data, executing an operation associated with the second subset of the application data, wherein the operation associated with the first subset of the application data and the operation associated with the second subset of the application data are executable in parallel;
        storing, after the first time point, operation data that indicates one or more operations performed by the application after the first time point; and
        performing, based on one of the at least one checkpoint and the stored operation data, application fault tolerance.

12. The information processing system according to claim 11, wherein the instructions, when executed by the one or more processors, cause the information processing system to store the application data by causing the information processing system to update, after storing the application data, one or more of the first vector or the second vector.

13. The information processing system according to claim 11, wherein the operation execution message is received while storing the application data.

14. The information processing system according to claim 11, wherein the second subset of the application data is associated with the write access.

15. The information processing system according to claim 11, wherein the operation execution message associated with the application data comprises an operation graph execution message of the application, and wherein the operation graph execution message comprises information classified in a time order of write access within first subset of the application data, of the application data, associated with write access.

16. The information processing system according to claim 11, wherein the instructions, when executed by the one or more processors, cause the information processing system to store the application data by causing the information processing system to:

store, using a time order of the write access, the first subset of the application data as a first checkpoint; and store, after the storing of the first subset of the application data, the second subset of the application data as a second checkpoint.

17. The information processing system according to claim 11, wherein the instructions, when executed by the one or more processors, cause the information processing system to:

select the first time point from a plurality of periodic time points that are recurring based on a predefined time interval.

18. The information processing system according to claim 11, wherein the first time point is based on an occurrence of one or more of:

a system resource usage exceeding a threshold, each task associated with the application being completed, or a fault comprising an error associated with an application process of the application.

19. The information processing system according to claim 11, wherein a first checkpoint of the at least one checkpoint is a last checkpoint before an occurrence of a fault.

20. The method of claim 1, wherein the application is an accelerator.

* * * * *